(12) United States Patent
Graber

(10) Patent No.: US 6,557,318 B2
(45) Date of Patent: May 6, 2003

(54) EXPANDABLE LINK SYSTEM AND METHOD OF MAKING SAME

(75) Inventor: Donald G. Graber, Garden City, MI (US)

(73) Assignee: Trim Trends Co, LLC, Farmington Hills, MI (US)

( * ) Notice: Subject to any disclaimer, the term of this patent is extended or adjusted under 35 U.S.C. 154(b) by 72 days.

(21) Appl. No.: 09/850,015

(22) Filed: May 7, 2001

(65) Prior Publication Data

US 2002/0162297 A1 Nov. 7, 2002

(51) Int. Cl.$^7$ ................................................. E04C 3/00
(52) U.S. Cl. ...................... 52/735.1; 52/709; 52/726.1; 52/730.1; 296/190.05; 280/800; 180/89.14; 403/316
(58) Field of Search ......................... 52/706, 709, 712, 52/726.1, 730.1, 735.1, 739.1, 655.1, 656.9; 296/29, 190.05, 190.07; 280/785, 800; 180/89.14; 403/187, 188, 317, 316, 318

(56) References Cited

U.S. PATENT DOCUMENTS

| | | | |
|---|---|---|---|
| 2,517,979 A | * 8/1950 | Collins | ........................... 52/375 |
| 2,904,140 A | * 9/1959 | Cleary | ........................... 52/377 |
| 3,129,624 A | 4/1964 | Auer | |
| 3,272,045 A | 9/1966 | Cookson | |
| 3,704,643 A | 12/1972 | Cookson | |
| 3,803,966 A | 4/1974 | Plegat | |
| 3,805,654 A | 4/1974 | Plegat | |
| 4,407,179 A | 10/1983 | Iwase et al. | |
| 4,464,074 A | * 8/1984 | Green et al. | .................. 211/182 |
| 4,530,226 A | 7/1985 | Granzow et al. | |
| 4,627,254 A | 12/1986 | Kitsukawa et al. | |
| 4,634,168 A | * 1/1987 | Fuchs et al. | ................. 280/785 |
| 4,964,256 A | * 10/1990 | McCracken | ............... 29/897.34 |
| 5,080,427 A | 1/1992 | Sturrus et al. | |
| 5,092,512 A | 3/1992 | Sturrus et al. | |
| 5,104,026 A | 4/1992 | Sturrus et al. | |
| 5,205,587 A | * 4/1993 | Orr | ............................. 280/785 |
| 5,305,625 A | 4/1994 | Heinz | |
| 5,306,058 A | 4/1994 | Sturrus et al. | |
| 5,395,036 A | 3/1995 | Sturrus | |
| 5,454,504 A | 10/1995 | Sturrus | |
| 5,566,874 A | 10/1996 | Sturrus | |
| 5,590,733 A | * 1/1997 | Ljungholm et al. | ....... 180/89.14 |
| 5,632,123 A | * 5/1997 | Erwin | ........................... 52/177 |
| 5,813,594 A | 9/1998 | Sturrus | |
| 5,816,217 A | 10/1998 | Ouchi et al. | |
| 5,974,932 A | 11/1999 | Suzuki et al. | |
| 6,088,989 A | * 7/2000 | Matsu et al. | .................. 52/36.5 |
| 6,102,605 A | * 8/2000 | Emmons | ..................... 296/209 |
| 6,301,854 B1 | * 10/2001 | Daudet et al. | ................. 52/262 |
| 6,390,719 B1 | * 5/2002 | Chan | .......................... 403/205 |

FOREIGN PATENT DOCUMENTS

| | | | | |
|---|---|---|---|---|
| EP | 494122 A | * | 7/1992 | .................. 52/706 |
| EP | 494781 A | * | 7/1992 | ................. 52/656.9 |
| JP | 2002103941 A | * | 4/2002 | ........... B60G/21/55 |

* cited by examiner

Primary Examiner—Carl D. Friedman
Assistant Examiner—Brian E. Glessner
(74) Attorney, Agent, or Firm—Dykema Gossett PLLC

(57) ABSTRACT

The flexible or expandable link for a heavy duty truck has an elongated U-shaped roll formed channel of a selected length made from a high strength metal and a pair of end brackets, each made from a sheet metal stamping of a lower strength metal, welded to the ends of the channel, with each end bracket having a pair of laterally spaced apart side walls having aligned openings in the side walls for receiving mounting pins or bushings.

14 Claims, 4 Drawing Sheets

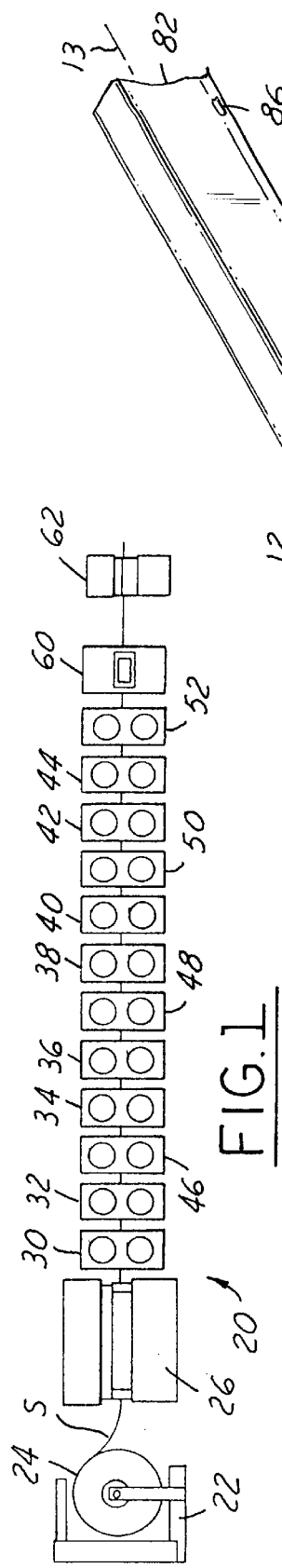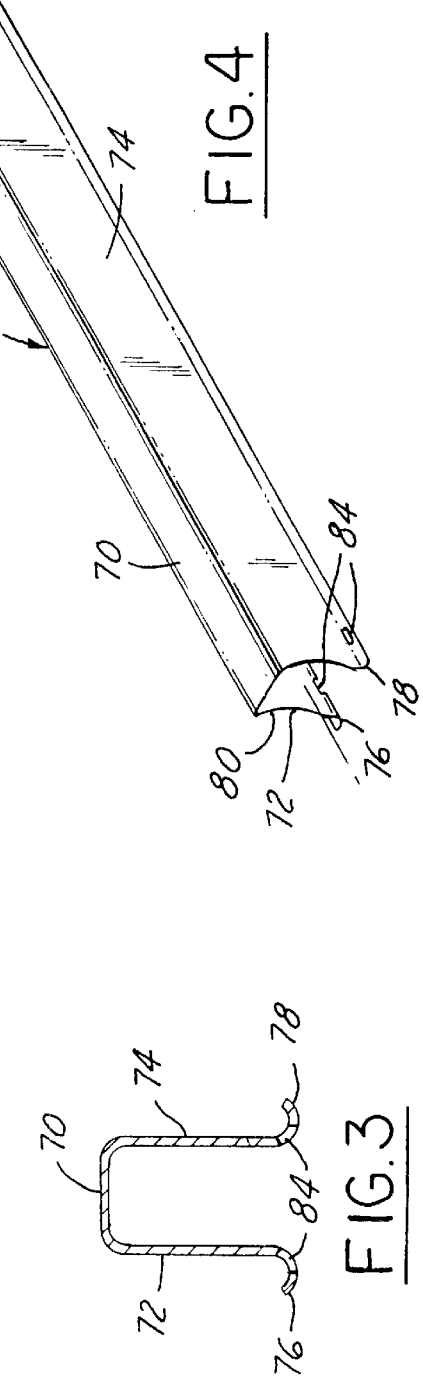

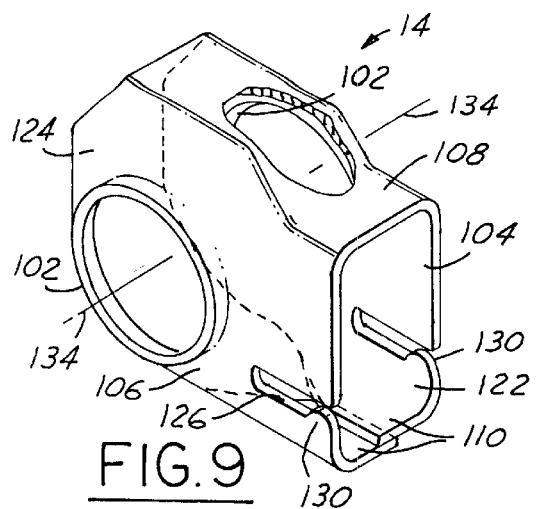
FIG.9
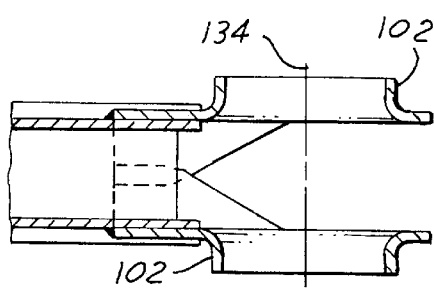
FIG.11
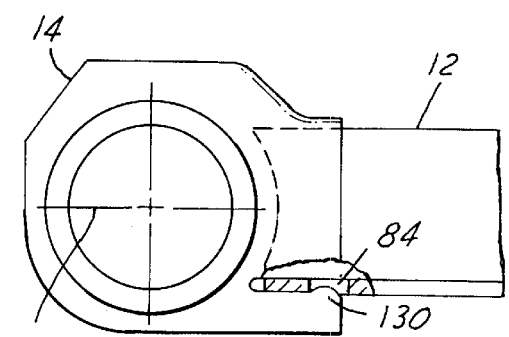
FIG.10
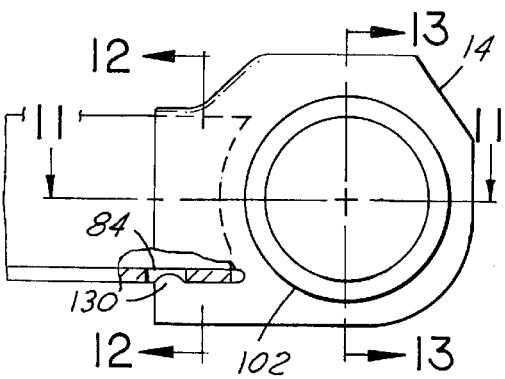
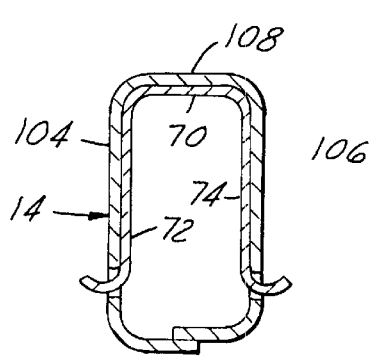
FIG.12
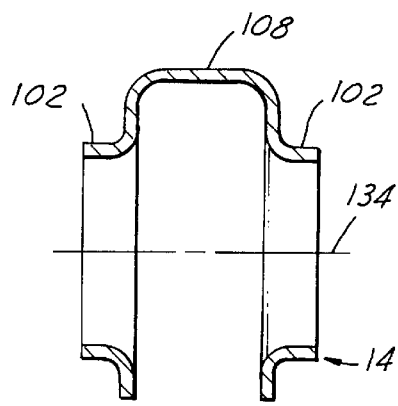
FIG.13

EXPANDABLE LINK SYSTEM AND METHOD OF MAKING SAME

BACKGROUND OF THE INVENTION

1. Field of the Invention

This invention relates to a link and more particularly to a transverse link, bar or control arm having an elongated center section of a high strength metal and end brackets of a lower strength metal welded to the ends of the center section. The link is, as an example, interposed between a rear axle assembly and frame of a heavy duty truck for restricting lateral movement of the axle and thereby possibly subjecting the link to buckling torsion or twisting or torque depending on the loads and forces within the heavy duty truck.

2. Description of the Prior Art

The link, bar or control arm of the prior art is of generally tubular construction, with the tubular center section and tubular end brackets made from high strength material welded to the tubular center section, each end of the rod having tubular bushings supporting pins or anchors for connecting the link, as an example, on one end to the rear axle assembly of the heavy duty truck and on the other end to the frame of the truck to thereby restrict lateral movement of the axle assembly.

One of the links now in existence has the elongated tubular body or spacer interposed between a pair of tubular end brackets. The tubular body or spacer, as an example, is made from 1010 steel, while the pair of tubular end brackets, as an example, are made from AISI 1045 steel. A FEA analysis was performed on the current tube design which weighed 3.04 kg, without any bushings. The body or spacer had a wall thickness of 4.1 mm. The end brackets each had a thickness of 6.5 mm. The buckling load for the current tube is 22,426 pounds, with a safety factor of 1.12. The torsional stiffness of the current tube is 370 (N-m/deg). The torque to first yield is 617 (N-m).

In the past, when it was necessary to provide a heavy duty truck link or control arm for a different purpose or application, with the link having a different overall length than previously used, a plasma cutter is used to cut the length and it is necessary to obtain new tooling to do it all the time. This resulted in additional costs for the purchaser of having to provide new tooling as well as the time required to manufacture the new truck link.

SUMMARY OF THE PRESENT INVENTION

It is a feature of the present invention to provide a link, bar, control rod or stabilizer having an elongated body or spacer made of a high strength material, with end brackets in the form of metal stampings, made from a lower grade steel and secured to the ends of the spacer.

With the foregoing construction, when a link of a different length is required, it will permit a manufacturer to use the same set of dies or tooling for making the metal stampings forming the end brackets. The length of the spacer or body can vary depending on the use of the link of the heavy duty truck, as an example, serving as a transverse link to restrict lateral movement of the rear axle assembly where one end of the link is connected to the rear axle assembly while the other end is connected to the frame of the heavy duty truck. Thus, between links of different lengths, the end brackets or stampings remain the same as does the cross section of the spacer or body which can be varied in length. If the cross section of the spacer was a different roll section all that is required is to make a set of rolls, resulting in the same expandable link system.

This invention permits the use of high strength steel in the middle of the link, with the end brackets being made from metal stampings which have a hardness between 30 ksi up to 60 ksi. As a result, the manufacturer will not be required to pre-heat treat the end bracket or anneal it and then heat treat. The manufacturer can select the strength of the steel required for the spacer right away without any heat treatment taking place with the result that the manufacturer can weld the sheet metal stampings rated at 30 ksi to 60 ksi to the spacer and provide what the customer requires without going to any secondary heat treating process. With the foregoing process, it permits the manufacturer to use different metals for the spacer and the end fittings and thus to compliment each other.

Another feature of the present invention is that the configuration and cross section of the stampings or end brackets remain the same. The invention permits the expanding of a link, as an example, with the spacer being anywhere from ten (10) inches to fifty (50) inches with no additional tooling required. This has certain economic advantages in that it permits the customer to pay one time up front and then from then on, the customer is not required to pay anything for merely changing the length of the link or control arm. Essentially, it is a matter of material adjustment. The process or system employed is the same, the cost is the same, other than for the material. Thus, the customer will know exactly the cost up front. It will provide the customer with a very comfortable feeling of knowing up front cost for projecting future projects for use of the expandable link. As an example, the link can also be used to serve as a stabilizer connecting the cab of the truck to the frame. Thus, it forms a link between the cab and the frame. In addition, similar suspension links are required for connecting the pig or the rear housing of the truck to the frame in order to stabilize same. Thus, the link or the stabilizer can vary in length anywhere from ten inches to twenty-six inches or up to fifty inches in length, if required. The link, of different lengths, would have the same pair of end fittings, stampings or brackets, with the spacer or center body having a different length. The present invention offers to the truck industry a system of links that is adjustable and flexible.

It is a feature of the present invention to provide a link for a heavy duty truck comprising an elongated U-shaped channel made from a high strength steel and having a pair of end portions, with the channel having a top wall, a pair of side walls and a pair of arcuate end surfaces, with the channel having a longitudinally extending axis spaced from the bottom and side walls of the channel; and a pair of end brackets for the channel, each end bracket made from a sheet metal stamping of a lower strength steel to provide a body of generally rectangular configuration at one end thereof which forms a receptacle for the corresponding end portion of the channel; and means for securing the end brackets to the channel.

Another feature of the present invention is to provide a link of the aforementioned type wherein each end bracket has a pair of laterally spaced apart side walls connected by a top wall and a pair of aligned openings in the side walls thereof.

Still another feature of the present invention is to provide a link of the aforementioned type wherein the top wall of each end bracket includes a portion which engages the corresponding end portion of the channel and an inclined ramp interposed in the top wall between the front and rear portions thereof.

A further feature of the present invention is to provide a link of the aforementioned type wherein the opposite edges of the side walls of each end bracket are provided with overlapping flanges which are secured together by welding the end brackets to the channel along the side and top walls of the end brackets.

A still further feature of the present invention is to provide a link of the aforementioned type wherein each end bracket has a pair of elongated slots provided in the corresponding side walls, with the channel having at its non-connected edges of its side walls, outwardly extending flanges of generally arcuate configuration which extends from one end of the channel to the other end, with the flanges at the end portions of the channel extending into the slots provided in the side walls of the end brackets.

Another feature of the present invention is to provide a link of the aforementioned type wherein the channel or spacer is made from a high strength steel, in the range of from 80 ksi to 140 ksi and the end brackets are made from sheet metal in the range of from 30 ksi to 60 ksi.

Still another feature of the present invention is to provide an end bracket for a link comprising a unitary body made from a sheet metal stamping, with the body having a pair of spaced apart side walls, a top wall and a pair of overlapping flanges forming the bottom wall, with the body being open at the front and back and with the body having a longitudinal axis extending through the ends of the body spaced between the side walls and the bottom and top walls, with the front end of the body being open and of generally rectangular configuration and the side walls having a pair of aligned circular bearing openings or bushings which are located on an axis which is perpendicular to the longitudinal axis.

A further feature of the present invention is to provide an end bracket of the aforementioned type wherein portions of the side walls near the overlapping flanges are provided with elongated slots, and with the upper edges of the side walls are curved starting at a place above the axis of the circular bearing openings and extending in a direction away from the slots.

A final feature of the present invention is to provide an expandable link system suitable for use in heavy duty trucks, with the link being simple in construction, economical to manufacture and efficient in use.

Additional advantages and features of the present invention will become apparent from the following description and the appended claims, taken in conjunction with the accompanying drawings.

BRIEF DESCRIPTION OF THE DRAWINGS

FIG. 1 is a schematic view of the roll-forming apparatus and related equipment for practicing the method or process of forming the elongated channel or spacer.

FIG. 2 is a side view of the channel or spacer, illustrating the curved end surfaces and the enlarged flange end portions.

FIG. 3 is a sectional view through the channel or spacer taken on the line 3—3 of FIG. 2.

FIG. 4 is a perspective view of the channel or spacer.

FIG. 9 is a perspective view, with parts broken away, of the end bracket.

FIG. 10 is an elevational view of the link, with parts broken away, and illustrating the end brackets mounted on the ends of the channel or spacer.

FIG. 11 is a fragmentary longitudinal sectional view taken on the line 11—11 of FIG. 10.

FIG. 12 is a sectional view taken on the line of 12—12 of FIG. 10.

FIG. 13 is a sectional view taken on the line 13—13 of FIG. 10.

DETAILED DESCRIPTION OF THE PREFERRED EMBODIMENT

Figure 5A:
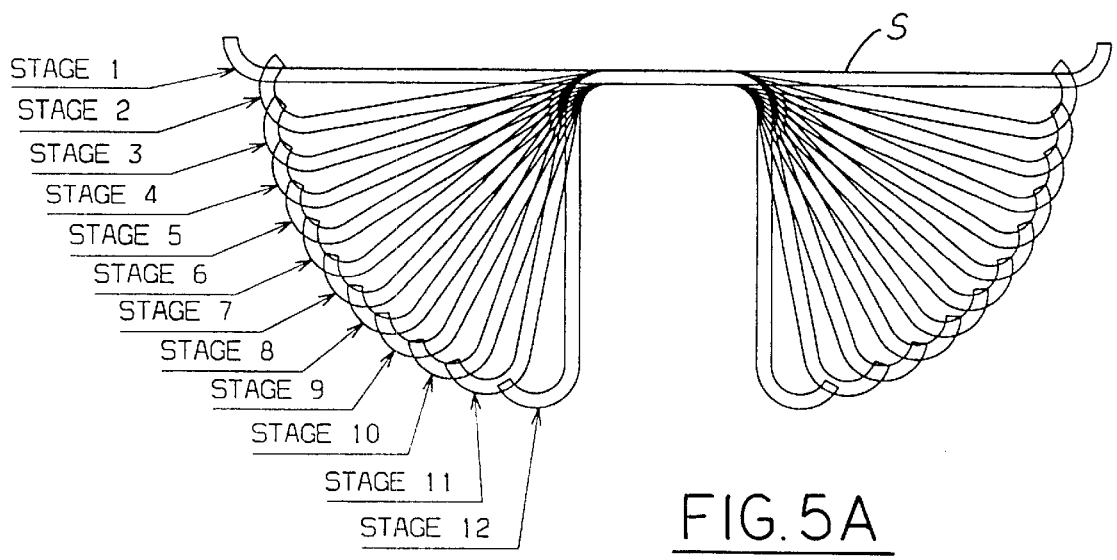
FIG. 5A is a diagram showing the configuration of the strip of metal as it moves through the twelve stages of the roll forming assemblies.
Figure 5B:
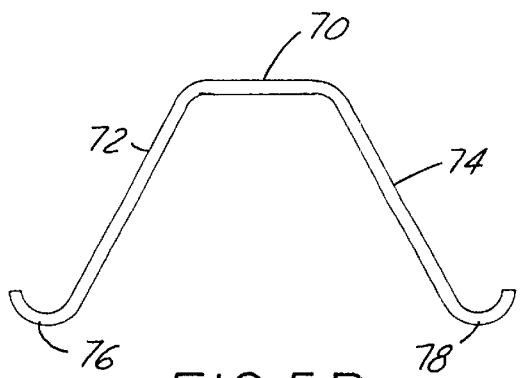
FIGS. 5B–5E inclusive are cross-sectional views of the sheet of material moving through a series of roll forming assemblies to form the channel or spacer.
Figure 5C:
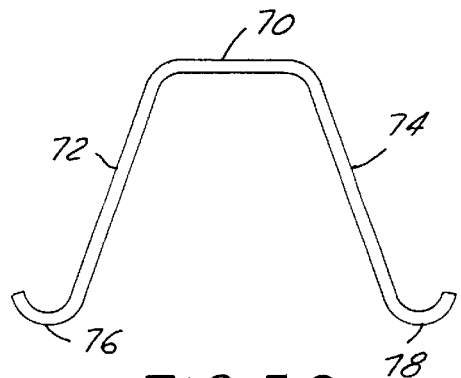
Figure 5D:
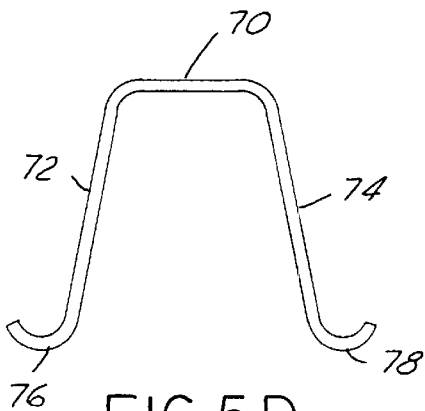
Figure 5E:
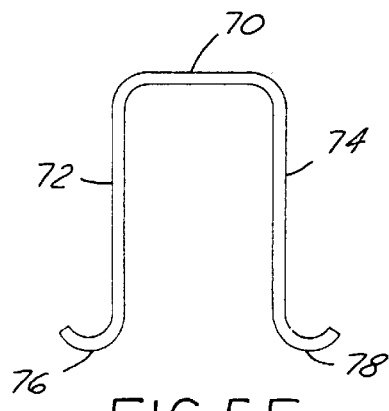

The present invention is directed to a flexible or expandable link which can serve various uses and functions in a heavy duty truck, as an example, serving as a transverse link, bar or rod for restricting lateral movement of the rear axle assembly. In addition, the link, bar or rod may serve as a stabilizer between the cab and frame of a heavy duty truck. These are just several of the examples of the use of the link made according to the present invention.

The link, bar or rod 10 is illustrated in FIG. 10. Components include the channel or spacer 12, which has a longitudinal axis 13, and the pair of end brackets 14. The channel or spacer 12 is made in a roll forming machine or apparatus 20 of FIG. 1 while the end brackets 14 are stamped and formed using the progressive die 18 diagrammatically illustrated in FIG. 6.

A schematic view of the apparatus 20 for forming the channel or spacer 12 is shown in FIG. 1. The roll forming apparatus 20, starting at the left side of FIG. 1, illustrates a metal roll holder 22 which rotatably supports the roll 24 which contains a flat strip S of metal such as 80 to 140 KSI steel. The strip S, of indeterminate length, has a predetermined width. The metal strip S initially moves through a pre-notch die 26 where any notching, piercing or punching operation take place including the formation of the slots or openings 84 and 86, to be subsequently described. The edges of the sheet S are cured (FIG. 5A) after the sheet S enters the roll forming assemblies as represented in the link flower diagram of FIG. 5A. The apparatus 20 includes eight roll forming assemblies 30, 32, 34, 36, 38, 40, 42 and 44 with four idle stations 46, 48, 50 and 52 for a total of twelve passes.

The strip of metal S as it proceeds through the roll forming apparatus 20 enters roll forming assembly or station 30 in generally a flat condition. As the sheet S of metal moves through the twelve stages of the roll forming apparatus 20, as represented in FIGS. 5A–5E, it will be observed that the center of the strip remains generally flat and fixed, with the outer legs or sides of the sheet S being bent downwardly and towards the center. The configuration of the spacer or channel 12 during the formation thereof is represented in FIGS. 5A–5E inclusive, with the final end view of the U-shape channel 12 being represented in FIG. 5E.

The strip S after having made the twelve passes through the roll forming assemblies 30–52 moves through the straightener or straightening blocks 60 and finally through the cut-off die 62 where the final length of the channel 12 is determined. The metal for the channel 12, as an example, may have a material/specification of the following: 0.126"× 10.467"×Coil (Martensite 80 KSI).

The channel or spacer 12 has a center, central or top wall 70 and a pair of side walls 72 and 74. The side wall 72 and 74 at the unsupported ends thereof are provided with curved flanges 76 and 78 respectively. The end surfaces of the flanges 72 and 74 are curved as best illustrated in FIG. 4 and as represented by the numerals 80 and 82, with the curved flanges 76, 78 at each end having a pair of openings or slots 84 and 86 as best shown in FIG. 4 for assisting in securing the spacer 12 to the end brackets 14.

It will be appreciated that the length of the channel or spacer 12 may vary, as an example, from 10 inches to 50 inches depending on the use or application of the link. It will also be appreciated that the same roll forming apparatus 20 can be utilized regardless of the length of the spacer or channel 12. It will only be necessary to adjust the cut-off mechanism 62 for the selected length.

Figure 6:
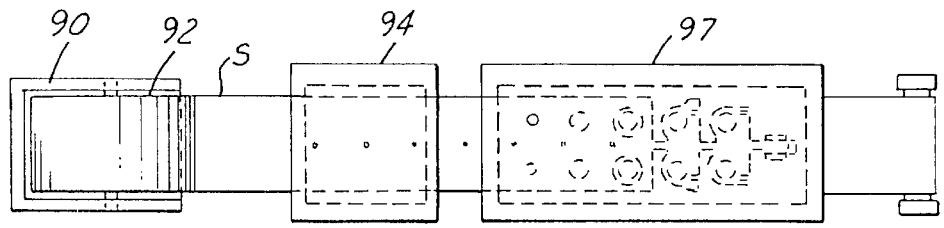
FIG. 6 is a schematic view of a progressive die for forming the end brackets of the present invention.
Figure 7:
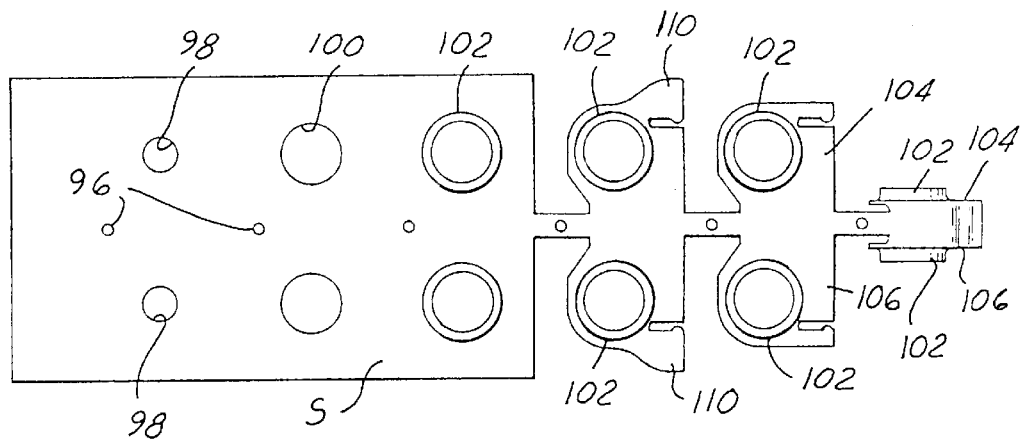
FIG. 7 is a plan view of a strip of metal removed from the progressive die and showing several of the piercing, notching, and bending steps required to form the end bracket.

The progressive stamping die 18 of FIG. 6 diagrammatically illustrates a holder 90 for a roll 92 of strip steel S which is directed through a punching die 94 which places at the center of the sheet S a series of locating holes 96 used for guiding the sheet S though the subsequent metal forming operations. The strip S continues to move through the pre-notch progressive die 97 where a series of punching, notching and bending operations take place. Initially the holes 98 are punched and thereafter the holes are enlarged as represented by the numeral 100 as the sheet S continues to move to the right as viewed in FIG. 7. The holes 100 are flanged to form a pair of aligned circular bearing openings or collars as represented by the numeral 102 in FIG. 7. As the sheet S continues to move to the right, the metal surrounding the holes or bearing openings 102 are cut away to provide the side walls 104 and 106 connected by the web, central or top wall 1108 and by the pair of overlapping flanges 110 which form a bottom wall.

Figure 8:
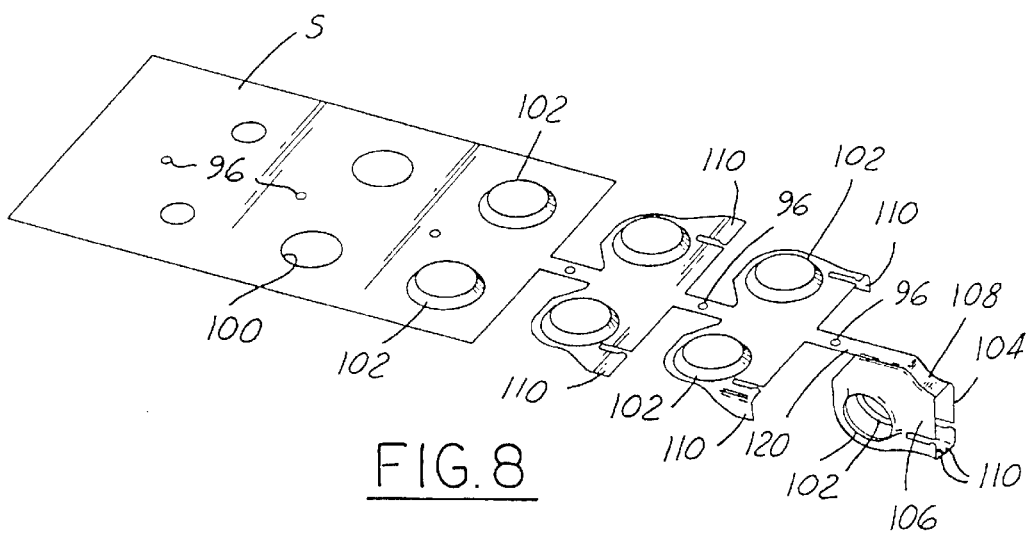
FIG. 8 is a perspective view of the strip of metal showing the various operations required to form the end brackets.

The stamped end bracket 14 after it is bent into the generally rectangular shape (FIGS. 8 and 9) is severed from the trailing bracket 14 by removing the connecting or attaching metal strip 120.

It will be noted by referring to FIG. 9 that the stamped end bracket 14 is of generally rectangular configuration when viewed from the side and from the end. The front end 122 and the back end 124 are opened. The side walls 104, 106 are each provided with an elongated slot 126 at the front end 122 which forms a receptacle for the corresponding end of the spacer or channel 12. The entrance to each slot 126 has a restriction or nub 130.

The pair of aligned circular bearing openings or collars 102 are located at the back end 124 of the end bracket 14, with the openings 102 located on a traverse axis 134 which intersects and is perpendicular to the longitudinal axis 13 of the spacer 12 when in an assembled condition as illustrated in FIG. 10.

When each end brackets 14 is assembled on an end of the spacer 12, the pair of nubs 130 are received in the slots or openings 84, 86 provided in the curved flanges 76, 78 of the spacer 12 as best illustrated in FIG. 10. The nubs and slots assist in locking the end bracket 14 on the spacer 12. After both end brackets 14 are assembled, the link 10 is directed to a welding station where the end brackets 14 are welded to the channel or spacer 12 along the side walls and top wall of the end brackets 14.

What I claim is:

1. A link for a heavy duty truck comprising:

an elongated U-shaped channel made from steel and having a pair of end portions;

said channel having a top wall, a pair of side walls and a pair of arcuate end surfaces;

said channel having a longitudinally extending axis spaced from said top and side walls of said channel;

a pair of end brackets for said channel;

each end bracket made from a sheet metal stamping to provide a body of generally rectangular configuration at one end thereof which forms a receptacle for the corresponding end portion of said channel;

means for securing said end-brackets to said channel;

each end bracket having a pair of laterally spaced apart side walls connected by a top wall; and a pair of aligned openings in the side walls of each end bracket, said openings being located on an axis perpendicular to said longitudinally extending axis.

2. The link as defined in claim 1 wherein the top wall of each end bracket includes a portion which engages the corresponding end portion of said channel and an inclined ramp interposed in said top wall between the front and rear portions thereof.

3. The link as defined in claim 1 wherein the opposite edges of the side walls of each end bracket are provided with overlapping flanges which are secured together.

4. The link as defined in claim 1 wherein said end brackets are welded to said channel along the side walls and top wall of said end brackets.

5. The link defined in claim 1 wherein each end bracket has a pair of elongated bracket slots provided in the corresponding side walls, said channel having at the non-connected longitudinal edges of said side walls outwardly extending and longitudinally extending flanges of generally arcuate configuration which extend from one end of the channel to the other end, with the flanges at the end portions of the channel extending into the bracket slots provided in the side walls of the end brackets.

6. The link defined in claim 5 wherein the changes of said channel side walls near the ends thereof are provided with channel slots, said end brackets having on the side walls thereof locking nubs which are received in said channel slots to assist in securing said end brackets to said channel.

7. The link defined in claim 1 wherein said channel is made from a high strength steel.

8. The link defined in claim 7 wherein said high strength steel is in the range of from 80 ksi to 140 ksi.

9. The link defined in claim 1 wherein said sheet metal body is made from sheet metal is in the range of from 30 ksi to 60 ksi.

10. The link as defined in claim 4 wherein said welding is gas welding.

11. The link defined in claim 1 wherein said end brackets may be used with channels of varying lengths to serve as a stabilizer link from the cab to the frame of the truck.

12. An end bracket for a link comprising a unitary body made from a sheet metal stamping;

said body having a pair of spaced apart side walls, a top wall and a pair of overlapping flanges forming a bottom wall;

said body being open at the front and back; said body having a longitudinal axis extending through the ends of said body spaced between said side walls and said top wall;

the front end of said body being open and of generally rectangular configuration;

said side walls having a pair of aligned circular bearing openings which are located on an axis perpendicular to said longitudinal axis;

portions of said side walls near said overlapping flanges being provided with elongated bracket slots;

said side walls adjacent the front end of said body and said bracket slots being provided with a pair of locking nubs.

13. The end bracket defined in claim 12 wherein said sheet metal is in the range from 30 ksi to 60 ksi.

14. The end bracket defined in claim 12 wherein the upper edges of said side walls are curved starting at a place above the axis of said circular bearing openings and extending in a direction away from said bracket slots.

* * * * *